(12) United States Patent
Contino et al.

(10) Patent No.: US 8,429,347 B2
(45) Date of Patent: Apr. 23, 2013

(54) EMULATING A REMOVABLE MASS STORAGE DEVICE

(75) Inventors: Jeffrey R. Contino, Shawnee, KS (US); Warren B. Cope, Olathe, KS (US); Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 13 days.

(21) Appl. No.: 13/248,878

(22) Filed: Sep. 29, 2011

(65) Prior Publication Data
US 2012/0023293 A1 Jan. 26, 2012

Related U.S. Application Data

(63) Continuation of application No. 11/945,524, filed on Nov. 27, 2007, now Pat. No. 8,098,598.

(51) Int. Cl.
*G06F 12/00* (2006.01)
(52) U.S. Cl.
USPC ............ 711/115; 711/154; 711/163; 370/259
(58) Field of Classification Search .................. 711/115, 711/154, 163; 370/259
See application file for complete search history.

(56) References Cited

U.S. PATENT DOCUMENTS

| | | | |
|---|---|---|---|
| 7,218,912 B2 * | 5/2007 | Erskine et al. | 455/405 |
| 7,685,322 B2 * | 3/2010 | Bhesania et al. | 710/8 |
| 7,809,376 B2 * | 10/2010 | Letourneau et al. | 455/445 |
| 8,316,160 B2 * | 11/2012 | Poo et al. | 710/36 |
| 2003/0074529 A1 | 4/2003 | Crohas | |
| 2003/0216954 A1 | 11/2003 | Buzzelli | |
| 2005/0070329 A1 | 3/2005 | Lection et al. | |
| 2005/0191998 A1 | 9/2005 | Onyon et al. | |
| 2006/0010270 A1 | 1/2006 | Zhang | |
| 2006/0069814 A1 | 3/2006 | Abraham et al. | |
| 2007/0143307 A1 | 6/2007 | Bowers et al. | |
| 2007/0186212 A1 | 8/2007 | Mazzaferri et al. | |
| 2007/0198656 A1 | 8/2007 | Mazzaferri et al. | |
| 2007/0201502 A1 | 8/2007 | Abramson | |
| 2007/0204115 A1 | 8/2007 | Abramson | |
| 2007/0289000 A1 | 12/2007 | Weiss | |
| 2008/0082310 A1 | 4/2008 | Sandorfi et al. | |

(Continued)

FOREIGN PATENT DOCUMENTS

WO 2008067432 6/2008

OTHER PUBLICATIONS

CNET Reviews; "Tritton WiFi NAS;" Nov. 26, 2007; 4 pages; http://reviews.cnet.com/external-hard-drives/tritton-wifi-nas/4505-3190_7-31149112.html?tag=mp.

(Continued)

*Primary Examiner* — Stephen Elmore

(57) ABSTRACT

A wireless communication device transfers instructions to a host device over a USB connection responsive to being connected to the host device over the USB connection. The instructions direct the host device to enumerate the wireless communication device as a USB MSC device. The wireless communication device wirelessly transfers a device identifier for the wireless communication device to a wireless communication network responsive to being connected to the host device over the USB connection. The wireless communication network processes the device identifier to limit communication service for the wireless communication device to communications with a particular data storage system.

20 Claims, 5 Drawing Sheets

U.S. PATENT DOCUMENTS

| | | | |
|---|---|---|---|
| 2008/0184125 A1 | | 7/2008 | Suleiman et al. |
| 2009/0031006 A1 | | 1/2009 | Johnson |
| 2009/0222655 A1 | | 9/2009 | Martinent et al. |
| 2009/0287857 A1 | * | 11/2009 | Vu .................................. 710/22 |
| 2009/0298480 A1 | | 12/2009 | Khambete et al. |
| 2010/0073127 A1 | * | 3/2010 | Fukushima .................... 340/5.6 |

OTHER PUBLICATIONS

Micro Anvika UK; "ASUS 40GB Wireless Hard Disk Drive," Nov. 26, 2007; 2 pages; http://www.microanvika.com/product.asp?TXT=INFO&PNO=ASU54305A&ref=sidebanner&cam=ASU54305A.

Belkin; "Wireless G USB Network Adapter," Nov. 26, 2007; 2 pages; http://catalog.belkin.com/IWCatProductPage.process?Product_Id=179211.

Memsen Corporation; "Mobile Interactive Marketing—Coming Soon!;" Nov. 26, 2007; 7 pages; http://www.memsen.com/datavendor_desc.htm.

Memsen Corporation; "Everybody has something to Share," Nov. 26, 2007; 1 page; http://www.memsen.com/index.htm.

* cited by examiner

EMULATING A REMOVABLE MASS STORAGE DEVICE

RELATED CASES

This patent application is a continuation of U.S. patent application Ser. No. 11/945,524 that was filed on Nov. 27, 2007, now U.S. Pat. No. 8,098,598 B1 and is entitled "EMULATING A REMOVABLE MASS STORAGE DEVICE" and that is hereby incorporated by reference into this patent application.

TECHNICAL BACKGROUND

Small, lightweight, removable and rewritable storage devices are becoming more popular. These devices, such as Universal Serial Bus (USB) "keychain drives" or USB flash drives, offer advantages over floppy disks. They are smaller, faster, more reliable, and more durable than floppy disks. Their reliability and durability is typically a result of the fact that these drives have no moving parts.

To access or store data on a USB flash drive, the drive must be connected to a computer. Typically, this is done by plugging the flash drive into a USB port built into the computer. These flash drives, like other USB devices, often can be connected and disconnected from the computer without opening the computer's enclosure. Once connected, the computer can then communicate with the USB flash drive using the USB mass storage standard. This standard is supported by many modern operating systems such as Windows and Linux. The USB connection may also supply power to the USB flash drive.

The Universal Serial Bus is defined in the Universal Serial Bus Specification, revision 1.1 and Universal Serial Bus Specification, revision 2.0 which are hereby incorporated herein by reference. These documents are available from the USB Implementers Forum web page.

OVERVIEW

A wireless communication device transfers instructions to a host device over a USB connection responsive to being connected to the host device over the USB connection. The instructions direct the host device to enumerate the wireless communication device as a USB MSC device. The wireless communication device wirelessly transfers a device identifier for the wireless communication device to a wireless communication network responsive to being connected to the host device over the USB connection. The wireless communication network processes the device identifier to limit communication service for the wireless communication device to communications with a particular data storage system.

DETAILED DESCRIPTION

Figure 1:
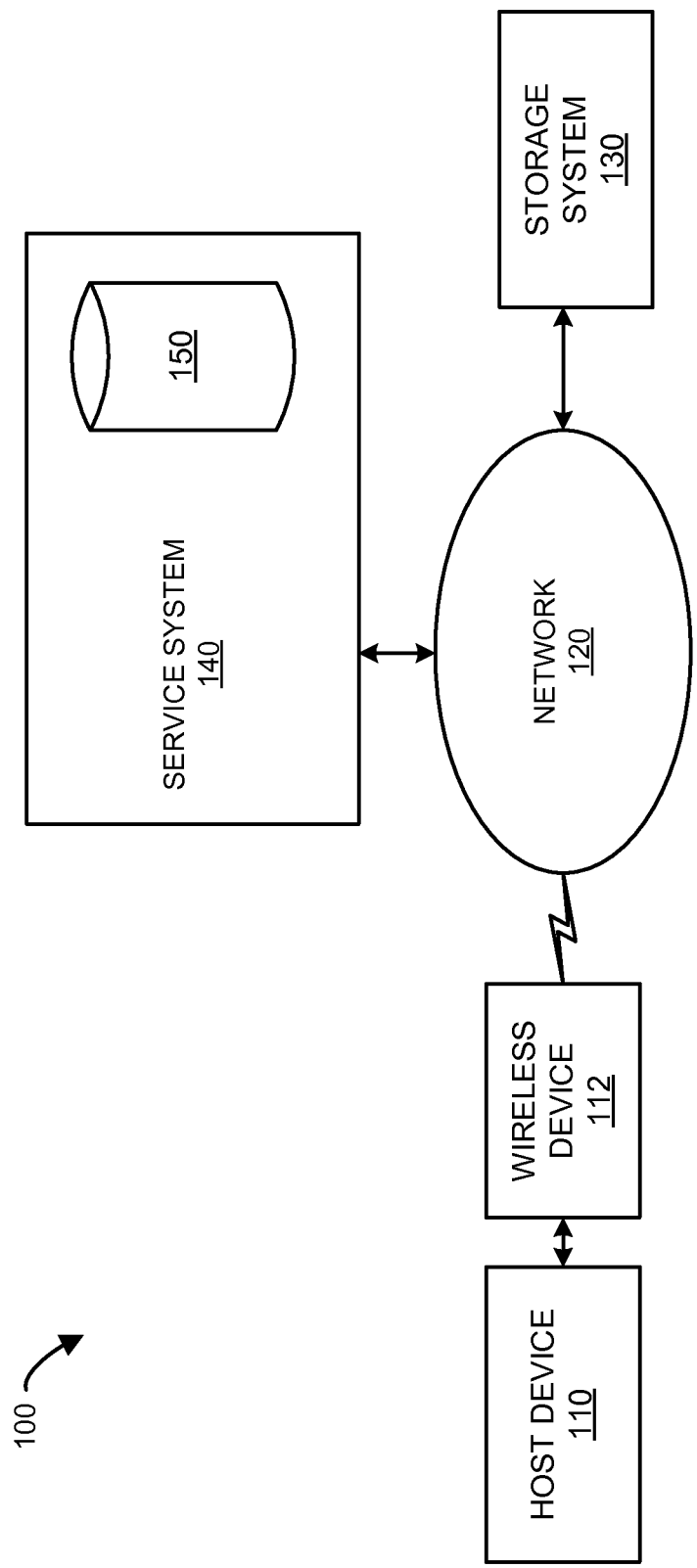
FIG. 1 is a block diagram illustrating a communication system that emulates a mass storage device.

FIG. 1 is a block diagram illustrating a communication system that can emulate a mass storage device. In FIG. 1, communication system 100 comprises host device 110, wireless device 112, network 120, service system 140, and storage system 130. Service system 140 includes database 150. Host device 110 is connected to wireless device 112. Wireless device 112 is operatively coupled to network 120 via a broadband wireless connection. Thus, host device 110 is operatively coupled to network 120. Network 120 is operatively coupled to service system 140. Network 120 is also operatively coupled to storage system 130. Since service system 140 includes database 150, and network 120 and storage system 130 are both operatively coupled to service system 140, network 120 and storage system 130 are operatively coupled to database 150.

Network 120 may be any network or collection of networks that couple, link, or otherwise operatively connect wireless device 112 with other devices or systems and is also operatively coupled to storage system 130. Network 120 may include other secondary data networks. In an example, network 120 may include a backhaul network, a local network, a long distance network, or a packet network, or any combination thereof, as well as other types of networks.

In an example, communication network 120 may be, or include all or parts of an IEEE 802.16 (WiMAX) specified system. These parts may include a base station (BS); an access services network (ASN), or connectivity service network (CSN). In another example, service system 140 may also be a part of a WiMAX specified system.

Service system 140 may be any system or collection of systems, such as database 150, capable of storing and retrieving information about at least one of: (a) services provided by network 120; (b) services provided by or to networks or users connected to network 120; or, (c) configuration information for network 120. In an example, service system 140 is part of a CSN and performs authentication, authorization, and accounting operations. Service system 140 may manage user or device profiles for authentication (e.g., verifying device identifier, user name, or password).

Service system 140 may provide configuration information to network 120 that specifies a type of service to deliver, and policies to enforce that may restrict access by, or services provided to, wireless device 112. For example, when wireless device 112 first couples to network 120, wireless device 112 may send a registration message to network 120 asking for permission to use network 120 to communicate to other systems. The registration message may include a device identifier. Network 120 may then forward that registration message, along with a device identifier to service system 140. Service system 140 may then query database 150 with the device identifier to determine if wireless device 112 may use network 120. Service system 140 may then inform network 120 whether mobile device 112 may use network 120.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to network 120 that determines how wireless device 112 may use network 120. For example, service system 140 may configure network 120 to operatively couple wireless device 112 only to storage system 130. This configuration would prevent wireless device 112 from utilizing other services such as operatively coupling to internet servers for viewing web pages.

Service system 140 may also configure network 120 to process packets coming from, or destined for, wireless device 112. For example, service system 140 may configure network 120 to translate packets received from wireless device 112 from one format or protocol to another before sending these translated packets to storage system 130. In another example, service system 140 may configure network 120 to translate packets received from storage system 130 from one format or protocol to another before sending these translated packets to wireless device 112. It should also be understood that service system 140 may include additional elements not pictured for the sake of clarity.

Wireless device 112 may be any device, system, or other such communication platform capable of wirelessly communicating with network 120. Wireless device 112 may be, for example, a mobile phone, a wireless phone, a wireless modem, a wireless USB modem, a personal digital assistant (PDA), as well as other types of devices or systems that can communicate wirelessly with network 120.

Wireless device 112 may process enumeration requests to and from host device 110. For example, wireless device 112 may be connected to host device 110 via a USB port. To successfully communicate with each other, host device 110 and wireless device 112 perform a USB enumeration process. This enumeration process is described in the Universal Serial Bus Specifications, revisions 1.1 and 2.0.

The enumeration process may also include a configuration process. To accomplish the configuration process, wireless device 112 may supply host device 110 with information about wireless device 112. One type of information that may be supplied to host device 110 by wireless device 112 is a device class. A device class helps inform host device 110 about the characteristics of wireless device 112. A device class may also help inform host device 110 about the protocols or capacities of wireless device 112. For example, wireless device 112 may inform host device 110 that it is a serial communication device, such as a modem.

In an embodiment, wireless device 112 informs host device 110 that wireless device 112 should be configured and controlled as a mass storage device. For example, wireless device 112 may, as part of a USB enumeration process, inform host device 110 that it should be enumerated as, and thus treated as, a USB Mass Storage Class (MSC) device.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page.

As a result of wireless device 112 informing host device 110 that wireless device 112 should be configured and controlled as a mass storage device, host device 110 may treat wireless device 112 as a locally attached mass storage device. For example, host device 110 may enumerate wireless device 112 as a USB flash drive. That may mean that host device 110 would use portions of its operating system software, such as device drivers, intended to be used with a USB flash drive to configure, control, and communicate with wireless device 112. Host device 110 may use these portions of its operating system software even though wireless devices in general would normally be enumerated as communication devices.

If host device 110 is treating wireless device 112 as a locally attached mass storage device, it allows wireless device 112 to be treated as locally attached mass storage by non-driver parts of the operating system and applications. For example, if host device 110 were running a Windows XP operating system, wireless device 112 may appear under the "Devices with Removable Storage" heading of the "My Computer" folder. Alternatively, wireless device 112 may appear under the "Hard Disk Drives" heading of the "My Computer" folder.

Host device 110 may also use communication and configuration protocols intended for locally attached mass storage devices to communicate with wireless device 112. Wireless device 112 may emulate a mass storage device by also using the corresponding communication and configuration protocols to communicate with host device 110. For example, host device 110 may use Advanced Technology Attachment Packet Interface (ATAPI) command blocks and command sets to communicate with wireless device 112. Likewise, wireless device 112 would use ATAPI command blocks and command sets to communicate with host device 110.

In another example, host device 110 may use the Small Computer System Interface (SCSI) commands to communicate with wireless device 112. Likewise, wireless device 112 would use SCSI commands to communicate with host device 110. In the preceding examples, these protocols may be encapsulated in USB packets for communication with wireless device 112 via a USB port on host device 110.

Network 120 may process packets of data it receives from wireless device 112 via a wireless communication link. These packets of data may, for example, comprise data destined for storage by storage system 130. In another example, these packets of data may contain data with communication and configuration protocols intended for locally attached mass storage devices to communicate. For example, wireless device 112 may send, and network 120 may receive and process, packets of data with Advanced Technology Attachment Packet Interface (ATAPI) command blocks and command sets. In another example, wireless device 112 may send, and network 120 may receive and process, Small Computer System Interface (SCSI) commands. In another example, these protocols may be encapsulated in USB packets and wireless device 112 may send, and network 120 may receive and process these USB packets.

Network 120 may process packets of data received from wireless device 112 to translate them into data or commands for storage system 130. Network 120 may also process packets of data received from storage system 130 to translate them into data or commands for wireless device 112. For example, network 120 may translate packets of data received from wireless device 112 into commands or data that is understood by a storage area network (SAN). Network 120 may also translate packets of data received from a SAN into data or commands for wireless device 112.

In another example, network 120 may translate packets of data received from wireless device 112 with ATAPI, SCSI, or USB commands or protocols into commands or data that may be understood by a SAN. Network 120 may also translate packets of data received from a SAN into ATAPI, SCSI, or USB commands or protocols. These packets from a SAN, once translated, may be sent to wireless device 112.

Storage system 130 is computer data storage connected to a computer network providing data access to network clients. For example, storage system 130 may be a SAN or network attached storage (NAS). Storage system 130 may also be a part of network 120. Storage system 130 may comprise storage and a network that is separate from, but operatively coupled to, network 120.

Figure 2:
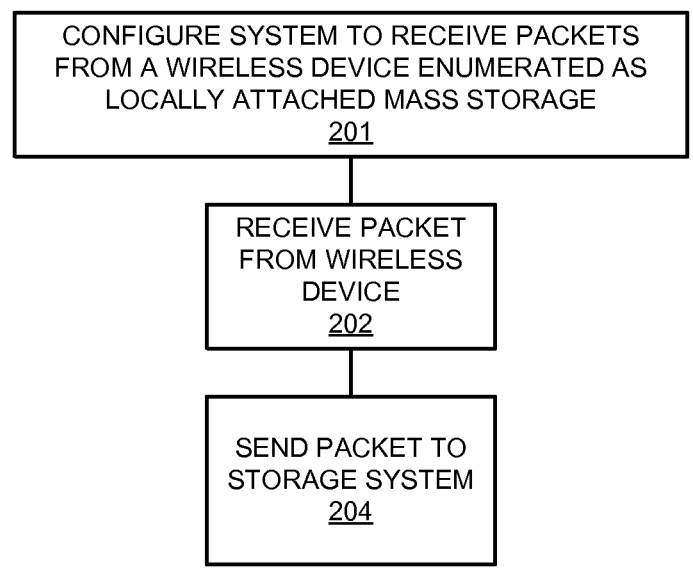
FIG. 2 is a flow chart illustrating a method of operating a communication system to emulate a mass storage device.

FIG. 2 is a flowchart illustrating a method of operating a communication system to emulate a mass storage device. The method of FIG. 2 may be performed by communication system 100. A communication system is configured to receive packets from a wireless device enumerated by a computer system as locally attached mass storage (201). A packet of data is received from the wireless communication device (202). This packet may be received and processed by network 120. If network 120 is configured appropriately by service system 140, the packet may also be translated by network 120.

A packet is sent to a storage system (204). This packet may be sent by network 120 to storage system 130. This packet may be the original packet received at 202. In addition, if network 120 is configured appropriately by service system 140, this packet may be a packet or packets that have been translated by network 120.

Figure 3:
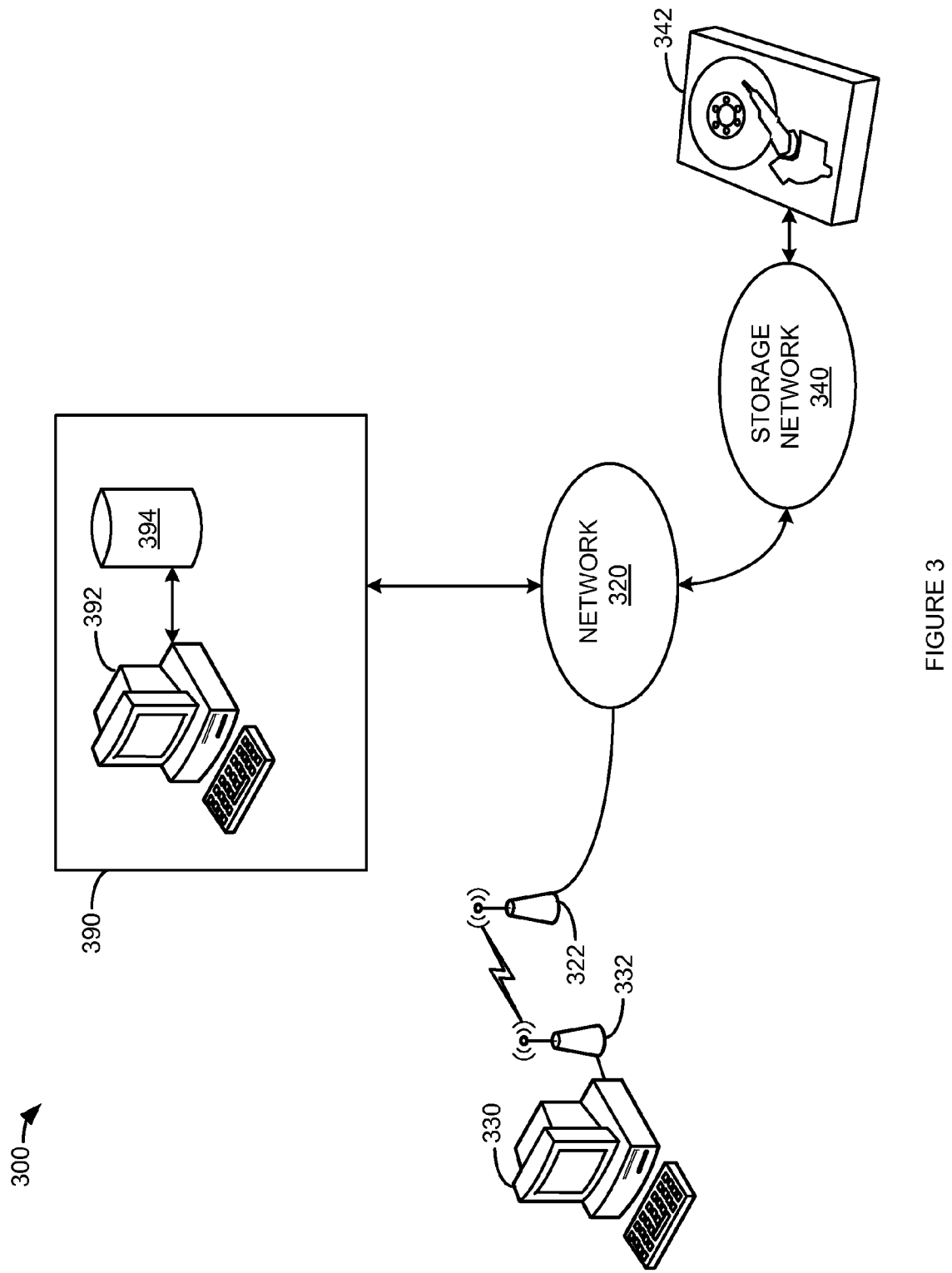
FIG. 3 is a block diagram illustrating a communication system that can emulate a mass storage device.

FIG. 3 is a block diagram illustrating a communication system that can emulate a mass storage device. In FIG. 3, communication system 300 comprises host computer 330, wireless device 332, base station 322, network 320, storage network 340, storage 342, and service system 390. Service system 390 includes computer system 392 and database 394. Host computer 330 is locally and physically connected to wireless device 332. Wireless device 332 is operatively coupled to base station 322 via a long range wireless link. Base station 322 is operatively coupled to network 320. Thus, host computer 330 is operatively coupled to network 320 via wireless device 332 and base station 322.

Network 320 is operatively coupled to service system 390. Network 320 is also operatively coupled to storage network 340. Storage network 340 is operatively coupled to storage 342. Since service system 390 includes computer system 392 and database 394, and network 320, storage network 340, and storage 342 are all operatively coupled to service system 390, then network 320, storage network 340, and storage 342 are operatively coupled to computer system 392 and database 394.

Network 320 could be any network or collection of networks that couple, link, or otherwise operatively connect base station 322, and by extension wireless device 332, with other devices or systems and is also operatively coupled to storage network 340. Network 320 may include other secondary data networks. In an example, network 320 may include a backhaul network, a local network, a long distance network, or a packet network, or any combination thereof, as well as other types of networks.

In an example, communication network 320 may be, or include all or parts of an IEEE 802.16 (WiMAX) specified system. These parts may include additional base stations, an access services network (ASN), or connectivity service network (CSN). In another example, service system 390 may also be a part of a WiMAX specified system.

Service system 390 may be any system or collection of systems, such as computer system 392 and database 394, that is capable of storing and retrieving information about at least one of: (a) services provided by network 320, such as communication and storage services; (b) services provided by, or to, networks or users, connected to network 320, such as communication or storage services; or, (c) configuration information for network 320. Service system 390 can also configure network 320. In an example, service system 390 is part of a CSN and performs authentication, authorization, and accounting (AAA) operations. Service system 390 may manage user or device profiles for authentication (e.g., verifying device identifier, user name, or password).

Service system 390 may also configure network 320 to that specify the type of service to deliver, and policies to enforce that may restrict access by, or services provided to, wireless device 332 or host computer 330. For example, when wireless device 332 first couples to base station 322, wireless device 332 may send a registration message to network 320 asking for permission to use network 320 to communicate to other systems. The registration message may include a device identifier. Network 320 may then forward that registration message, along with a device identifier to service system 390. Service system 390 may then use computer system 392 to query database 394 with the device identifier to determine if wireless device 332 or host computer 330 may use base station 322 and network 320. Service system 390 may then inform network 320 or base station 322 whether mobile device 332 or host computer 330 may use network 320.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 390 may also query database 394 to configure network 320 in a way that determines how wireless device 332 or host computer 330 may use network 320. For example, service system 390 may configure network 320 to only operatively couple wireless device 332 to storage network 340. By extension, this configuration would function to limit host computer 330 to only being operatively coupled with storage network 340 and storage 342. This configuration may also prevent host computer 330 from utilizing other services such as operatively coupling to internet servers for viewing web pages.

Service system 390 may also configure network 320 to process packets coming from, or destined for, host computer 330. For example, service system 390 may configure network 320 to translate packets received from wireless device 332 from one format or protocol to another before sending these translated packets to storage 342 via storage network 340. In another example, service system 390 may configure network 320 to translate packets received from storage 342 via storage network 340 from one format or protocol to another before sending these translated packets to wireless device 332. It should also be understood that service system 390 may include additional elements not pictured for the sake of clarity.

Wireless device 332 may be any device, system, or other such communication platform capable of wirelessly communicating with base station 322 and thus network 320. Wireless device 332 may be, for example, a mobile phone, a wireless phone, a wireless modem, a wireless USB modem, a personal digital assistant (PDA), as well as other types of devices or systems that can communicate wirelessly with network 320.

Wireless device 332 may process enumeration requests to and from host computer 330. For example, wireless device 332 may be connected to host computer 330 via a USB port. To successfully communicate with each other, host computer 330 and wireless device 332 perform a USB enumeration process. This enumeration process is described in the Universal Serial Bus Specifications, revisions 1.1 and 2.0.

The enumeration process may also include a configuration process. To accomplish the configuration process, wireless device 332 may supply host computer 330 with information about wireless device 332. One type of information that may be supplied to host computer 330 by wireless device 332 is a device class. A device class helps inform host computer 330 about the characteristics of wireless device 332. A device call may also help inform host computer 330 about the protocols or capacities of wireless device 332. For example, wireless device 332 may inform host computer 330 that it is a serial communication device, such as a modem.

In an embodiment, wireless device 332 informs host computer 330 that wireless device 332 should be configured and controlled as a mass storage device. For example, wireless device 332 may, as part of a USB enumeration process, inform host computer 330 that it should be treated as a USB Mass Storage Class (MSC) device.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page.

As a result of wireless device 332 informing host computer 330 that wireless device 332 should be configured and controlled as a mass storage device, host computer 330 may treat wireless device 332 as a locally attached mass storage device. For example, host computer 330 may enumerate wireless device 332 as a USB flash drive. That means that host computer 330 would use portions of its operating system software, such as device drivers, intended to be used with a USB flash drive to configure, control, and communicate with wireless device 332. Accordingly, host computer 330 would be controlling and communicating with wireless device 332 as if it was a USB flash drive. Host computer 330 may use these portions of its operating system software even though wireless devices in general would normally be enumerated as communication devices.

If host computer 330 is treating wireless device 332 as a locally attached mass storage device, it allows wireless device 332 to be treated as locally attached mass storage by non-driver parts of the operating system and applications. For example, if host computer 330 were running a Windows XP operating system, wireless device 332 may appear under the "Devices with Removable Storage" heading of the "My Computer" folder. Alternatively, wireless device 332 may appear under the "Hard Disk Drives" heading of the "My Computer" folder.

Host computer 330 may also use communication and configuration protocols intended for locally attached mass storage devices to communicate with wireless device 332. Wireless device 332 may emulate a mass storage device by also using the corresponding communication and configuration protocols to communicate with host computer 330. Wireless device 332 may send and receive data to storage 342 via network 320 and storage network 340 to provide an emulated capacity (e.g., number of bytes) that is far greater than would normally be found on a locally attached mass storage device.

In an example, host computer 330 may use Advanced Technology Attachment Packet Interface (ATAPI) command blocks and command sets to communicate with wireless device 332. Likewise, wireless device 332 would use ATAPI command blocks and command sets to communicate with host computer 330.

In another example, host computer 330 may use the Small Computer System Interface (SCSI) commands to communicate with wireless device 332. Likewise, wireless device 332 would use SCSI commands to communicate with host computer 330. In the preceding examples, these protocols may be encapsulated in USB packets for communication with wireless device 332 via a USB port on host computer 330.

In order to facilitate the emulation of a locally attached mass storage device by wireless device 332, network 320 may process packets of data it receives from wireless device 332. These packets may, for example, comprise data destined for storage 342. In an example, these packets of data may contain data with communication and configuration protocols intended for locally attached mass storage devices to communicate. These communication and configuration protocols may be emulated by wireless device 332, network 320, or storage network 340. These communication and configuration protocols may also be simply passed along to storage 342 so that storage 342 may process them natively.

In an example, wireless device 332 may send, and network 320 may receive, transfer, or process, packets of data with Advanced Technology Attachment Packet Interface (ATAPI) command blocks and command sets. In another example, wireless device 332 may send, and network 320 may receive, transfer, or process, Small Computer System Interface (SCSI) commands. In another example, these protocols may be encapsulated in USB packets and wireless device 332 may send, and network 320 may receive, transfer, or process these USB packets.

Network 320 may process packets of data received from wireless device 332 to translate them into data or commands for storage 342 or storage network 340. Network 320 may also process packets of data received from storage 342 via storage network 340 to translate them into data or commands for wireless device 332. For example, network 320 may translate packets of data received from wireless device 332 into commands or data that is understood by a storage network 340 or storage 342. Network 320 may also translate packets of data received from storage 342 or storage network 340 into data or commands for wireless device 332.

In another example, network 320 may translate packets of data received from wireless device 332 with ATAPI, SCSI, or USB commands or protocols into commands or data that may be understood storage network 340 or storage 342. Network 320 may also translate packets of data received from storage 342 or storage network 340 into ATAPI, SCSI, or USB commands or protocols. These packets, once translated, may be sent to wireless device 332.

Storage network 340 and storage 342 comprise computer data storage connected to a computer network that provides data access to network clients. For example, storage network 340 together with storage 342 may be a SAN or network attached storage (NAS). Storage network 340 may comprise a network that is separate from, but operatively coupled to, network 320. In this case, storage 342 would also be separate from, but operatively coupled to, network 320. In an alternative, storage network 340 may be part of network 320. In this case, storage 342 may comprise storage that is part of network 320.

Figure 4:
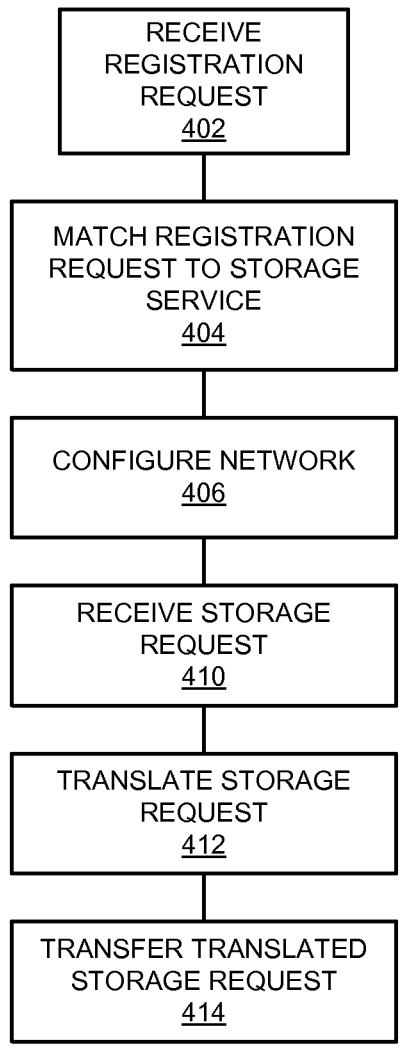
FIG. 4 is a flow chart illustrating a method of operating a communication system to emulate a mass storage device.

FIG. 4 is a flow chart illustrating a method of operating a communication system to emulate a mass storage device. The steps of FIG. 4 may be performed by communication system 300 or 100. In a step 402, a registration request is received. For example, the registration request may be received from wireless device 332 by base station 322. Base station 322 may then forward the registration request to network 320 which may further forward the registration request to service system 390.

In a step 404, a registration request is matched to a storage service. For example, service system 390 may match the registration request to a storage service by querying database 394. The registration request may be the registration request received in step 404. The registration request may be matched to a storage service by an association of a device identifier to a storage service. For example, a MAC address given in the registration request may be associated with a uniform resource locator (URL) that specifies a storage service. In another example, a MAC address may be associated with an internet protocol (IP) address and user datagram protocol (UDP) port number that provides a storage service. In another example, a URL identifies a computer system and a location (e.g., folder or directory) that will act as a storage service.

In a step 406, a network is configured to supply the matched storage service to the device that made the registration request in step 402. For example, network 320 may be configured to route packets received from wireless device 332 via base station 322 to storage network 340. Network 320 may also be configured to translate packets received from, or going to, wireless device 332. Examples of types of translations that may be performed are given in the discussion of network 320.

In another example, network 320 may be configured to ignore or change routing information in packets from wireless device 332. By ignoring or changing the routing information in packets from wireless device 332, network 320 may be configured to limit wireless device 332 to communicating with storage network 340 and/or storage 342. Network 320 may also be configured to implement certain protocols necessary to establish a storage session with storage network 340 or storage 342 thereby allowing wireless device 332 to implement a smaller set of protocols in order to function as an emulated locally attached mass storage device that stores data using storage service.

In a step 410, a storage request is received. In an example, this request is received by network 320 from either wireless device 332 or storage network 340. The storage request may be, for example, to read or write a block of data. In another example, the storage request may be of a higher level nature such as a request for directory information (e.g., file name, size, read-write properties, date of modification, etc.). The set of types of requests would include those that are necessary for wireless device 332 to emulate a locally attached mass storage device using the storage service matched to wireless device 332 in step 404 as a storage location. The set of types of requests would depend, at least in part, upon the configuration of network 320 and which protocols related to the storage service are implemented by wireless device 332, network 320, storage network 340, and storage 342, respectively.

In a step 412, the storage request is translated. In an example, the storage request is translated by network 320. In another example, the storage request is translated by wireless device 332. In another example, the storage request is translated by storage network 340. Discussions of the types of translations that may be performed have been given previously.

In a step 414, the translated storage request is transferred. In an example, the translated storage request is transferred to storage network 340. In an example, the translated storage request is transferred to storage 342. In an example, the translated storage request is transferred to network 320. In an example, the translated storage request is transferred to wireless device 332.

In a further example, the translated storage request may comprise a command to read or write data to or from storage 342. In this example, host computer 330 may have made a request to read data from the locally attached mass storage device that wireless device 332 is enumerated as. For example, this request may comprise a SCSI request encapsulated in a USB packet. At least one of wireless device 332, network 320, or storage network 340 translates this request into another protocol. For example, the encapsulated SCSI request may be translated to a file transfer protocol (FTP) request. The FTP request is then transferred to storage network 340.

Continuing the example, storage network 340 may then respond to the request with another request. For example, storage network 340 may respond with a packet containing data that wireless device 332 requested in the encapsulated SCSI request. The response request may be requesting that the response packet be sent to wireless device 332. At least one of wireless device 332, network 320, or storage network 340 translates this request into another protocol. For example, the response packet of data may be translated into a SCSI response encapsulated in a USB packet.

The methods, systems, networks, databases, and storage described above may be implemented with or executed by one or more computer systems. The methods described above may also be stored on a computer readable medium. Many of the elements of communication network 100 and communication network 300 may be, comprise, or include computers systems. This includes, but is not limited to communication system 100, host device 110, wireless device 112, network 120, service system 140, storage system 130, database 150, communication system 300, host computer 330, wireless device 332, base station 322, network 320, storage network 340, storage 342, service system 390, computer system 392 and database 394.

Figure 5:
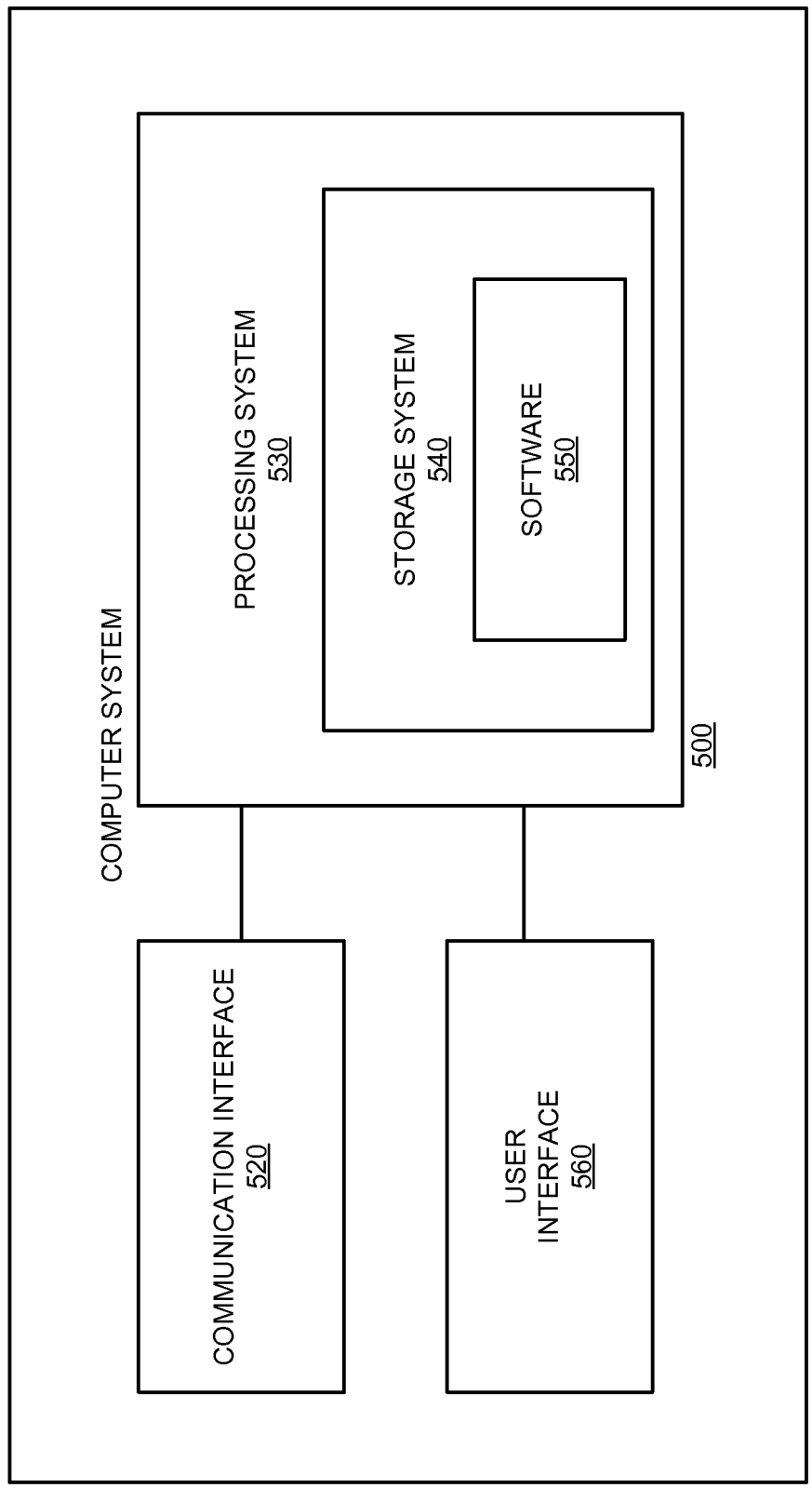
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system wherein a user connects a wireless communication device to a host device over a Universal Serial Bus (USB) connection, the method comprising:
    in the wireless communication device, transferring instructions to the host device over the USB connection responsive to being connected to the host device over the USB connection, wherein the instructions direct the host device to enumerate the wireless communication device as a USB Mass Storage Class (MSC) device;
    in the wireless communication device, wirelessly transferring a device identifier for the wireless communication device to a service system in the wireless communication network responsive to being connected to the host device over the USB connection; and
    in the service system, processing the device identifier to direct the wireless communication network to limit communication service for the wireless communication device to communications with a particular data storage system.

2. The method of claim 1 wherein processing the device identifier to limit communication service to the particular data storage system comprises associating the device identifier with a uniform resource locator for the particular data storage system.

3. The method of claim 1 further comprising, in the wireless communication device, receiving a storage command from the host device over the USB connection and wirelessly transferring the storage command to the wireless communication network for delivery to the particular storage system.

4. The method of claim 3 further comprising:
    in the service system, processing the device identifier to direct the wireless communication network to perform a storage protocol translation between the wireless communication device and the particular storage system; and
    in the wireless communication network, receiving the storage command in a first storage protocol from the wireless communication device, translating the storage command from the first storage protocol into a second protocol for the particular storage system, and transferring the translated storage command to the particular storage system.

5. The method of claim 4 wherein the first storage protocol comprises one of an Advanced Technology Attachment Packet Interface (ATAPI) protocol and a Small Computer System Interface (SCSI) protocol.

6. The method of claim 4 wherein the second storage protocol comprises File Transfer Protocol (FTP).

7. The method of claim 1 further comprising, in the wireless communication device, receiving a storage command from the particular storage system over the wireless communication network and transferring the storage command to the host device over the USB connection.

8. The method of claim 7 further comprising:
    in the service system, processing the device identifier to direct the wireless communication network to perform a storage protocol translation between the particular storage system and the wireless communication device; and
    in the wireless communication network, receiving the storage command in a first storage protocol from the particular storage system, translating the storage command from the first storage protocol into a second storage protocol for the host device, and transferring the translated storage command to the wireless communication device.

9. The method of claim 8 wherein the first storage protocol comprises a File Transfer Protocol (FTP).

10. The method of claim 8 wherein the second storage protocol comprises one of an Advanced Technology Attachment Packet Interface (ATAPI) protocol and a Small Computer System Interface (SCSI) protocol.

11. A communication system comprising:
    a wireless communication device configured to transfer instructions to a host device over a Universal Serial Bus (USB) connection responsive to being connected to the host device over the USB connection, wherein the instructions direct the host device to enumerate the wireless communication device as a USB Mass Storage Class (MSC) device;
    the wireless communication device configured to wirelessly transfer a device identifier for the wireless communication device to a wireless communication network responsive to being connected to the host device over the USB connection; and
    a service system in the wireless communication network configured to process the device identifier to direct the wireless communication network to limit communication service for the wireless communication device to communications with a particular data storage system.

12. The communication system of claim 11 wherein the service node is configured to limit communication service to the particular data storage system by associating the device identifier with a uniform resource locator for the particular data storage system.

13. The communication system of claim 11 wherein the wireless communication device is configured to receive a storage command from the host device over the USB connection and wirelessly transfer the storage command to the wireless communication network for delivery to the particular storage system.

14. The communication system of claim 13 wherein:
    the service system is configured to process the device identifier to direct the wireless communication network to perform a storage protocol translation between the wireless communication device and the particular storage system; and
    the wireless communication network is configured to receive the storage command in a first storage protocol from the wireless communication device, translate the storage command from the first storage protocol into a second protocol for the particular storage system, and transfer the translated storage command to the particular storage system.

15. The communication system of claim 14 wherein the first storage protocol comprises one of an Advanced Technology Attachment Packet Interface (ATAPI) protocol and a Small Computer System Interface (SCSI) protocol.

16. The communication system of claim 14 wherein the second storage protocol comprises File Transfer Protocol (FTP).

17. The communication system of claim 11 wherein the wireless communication device is configured to receive a storage command from the particular storage system over the wireless communication network and transfer the storage command to the host device over the USB connection.

18. The communication system of claim 17 wherein:
- the service system is configured to process the device identifier to direct the wireless communication network to perform a storage protocol translation between the particular storage system and the wireless communication device; and
- the wireless communication network is configured to receive the storage command in a first storage protocol from the particular storage system, translate the storage command from the first storage protocol into a second storage protocol for the host device, and transfer the translated storage command to the wireless communication device.

19. The communication system of claim 18 wherein the first storage protocol comprises a File Transfer Protocol (FTP).

20. The communication system of claim 18 wherein the second storage protocol comprises one of an Advanced Technology Attachment Packet Interface (ATAPI) protocol and a Small Computer System Interface (SCSI) protocol.

\* \* \* \* \*